US009739679B2

United States Patent
Pan et al.

(10) Patent No.: US 9,739,679 B2
(45) Date of Patent: *Aug. 22, 2017

(54) DROPLET-BASED CAPACITIVE HUMIDITY SENSOR

(71) Applicant: THE REGENTS OF THE UNIVERSITY OF CALIFORNIA, Oakland, CA (US)

(72) Inventors: Tingrui Pan, Woodland, CA (US); Baoqing Nie, Davis, CA (US); Siyuan Xing, Davis, CA (US); James D. Brandt, Los Angeles, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/272,806

(22) Filed: Sep. 22, 2016

(65) Prior Publication Data

US 2017/0108392 A1    Apr. 20, 2017

Related U.S. Application Data

(63) Continuation of application No. 14/923,956, filed on Oct. 27, 2015, now Pat. No. 9,459,171, which is a (Continued)

(51) Int. Cl.
   *G01L 9/00*    (2006.01)

(52) U.S. Cl.
   CPC .......... *G01L 9/0072* (2013.01); *G01L 9/0092* (2013.01); *G01L 9/0095* (2013.01)

(58) Field of Classification Search
   CPC ... G01L 9/0072; G01L 9/0075; G01L 9/0073; G01L 9/0092; G01L 9/0095
   (Continued)

(56) References Cited

U.S. PATENT DOCUMENTS 6,919,521 B2 *    7/2005 Miller .................. G01L 9/0058
                                              200/83 R
9,170,166 B2    10/2015 Pan et al.
(Continued)

OTHER PUBLICATIONS

Bakhoum et al. (Bakhoum et al., "Novel Capacitive Pressure Sensor", Journal of Microelectromechanical Systems, vol. 19, No1. 2, Jun. 2010).*
(Continued)

*Primary Examiner* — Lisa Caputo
*Assistant Examiner* — Nathaniel T Woodward
(74) *Attorney, Agent, or Firm* — O'Banion & Ritchey LLP; John P. O'Banion (57) ABSTRACT

A pressure sensing apparatus which utilizes an electrolytic droplet retained between a first and second sensing electrode within a housing. Contact between the electrolyte droplet and the electrodes form electric double layers (EDL) having interfacial EDL capacitance proportional to interface contact area which varies in response to mechanical pressure applied to deform exterior portions of the housing. The electrolyte contains a sufficient percentage of glycerol to prevent evaporative effects. Preferably, the sensing electrodes are modified with depressions, hydrophilic and/or hydrophobic portions to increase central anchoring of the electrolyte droplet within the housing. The inventive pressure sensor provides high sensitivity and resolution which is beneficial to numerous applications, and is particularly well-suited for medical sensing applications.

29 Claims, 7 Drawing Sheets

Related U.S. Application Data continuation of application No. 14/106,760, filed on Dec. 14, 2013, now Pat. No. 9,170,166.

(60) Provisional application No. 61/737,712, filed on Dec. 14, 2012.

(58) Field of Classification Search
USPC .................................. 73/724, 723, 715, 700
See application file for complete search history.

(56) References Cited

U.S. PATENT DOCUMENTS

| | | |
|---|---|---|
| 9,459,171 B2 | 10/2016 | Pan et al. |
| 2012/0055257 A1 | 3/2012 | Shaw-Klein |
| 2012/0062245 A1 | 3/2012 | Bao et al. |

OTHER PUBLICATIONS

Bakhoum, E. G. et al., "Novel Capacitive Pressure Sensor," J. Microelectromechanical Systems, vol. 19, No. 3, Jun. 2010, pp. 443-450.

Wu, C.-Y. et al., "Integrated ionic liquid-based electrofluidic circuits for pressure sensing within polydimethylsiloxane microfluidic systems", Lab Chip, vol. 11, Mar. 30, 2011, pp. 1740-1746.

Mansfield, S. C. B. et. al., "Highly sensitive flexible pressure sensors with microstructured rubber dielectric layers", Nature Materials, vol. 9, Sep. 12, 2010, pp. 859-864.

\* cited by examiner

DROPLET-BASED CAPACITIVE HUMIDITY SENSOR

CROSS-REFERENCE TO RELATED APPLICATIONS

This application is a continuation of U.S. patent application Ser. No. 14/923,956 filed on Oct. 27, 2015, incorporated herein by reference in its entirety, now U.S. Pat. No. 9,459,171, incorporated herein by reference in its entirety, which is a continuation of U.S. patent application Ser. No. 14/106,760 filed on Dec. 14, 2013, incorporated herein by reference in its entirety, now U.S. Pat. No. 9,170,166, incorporated herein by reference in its entirety, which claims priority to, and the benefit of, U.S. provisional patent application Ser. No. 61/737,712 filed on Dec. 14, 2012, incorporated herein by reference in its entirety.

STATEMENT REGARDING FEDERALLY SPONSORED RESEARCH OR DEVELOPMENT

This invention was made with Government support under ECCS-0846502 and EFRI-0937997, awarded by the National Science Foundation. The Government has certain rights in the invention.

INCORPORATION-BY-REFERENCE OF MATERIAL SUBMITTED IN A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to pressure sensing devices, and more particularly to a droplet-based capacitive pressure sensing device.

2. Description of Related Art

Microfluidic-based sensors have been an active area of research for their excellent flexibility, high sensitivity, simple fabrication, and wide adaptability. A variety of sensing and actuation mechanisms have been incorporated in the development of microfluidic sensing devices, the majority of which rely on sensing changes in a physical property (e.g., optical, electrical or mechanical) induced by fluidic displacement, and/or new material functionality introduced to working fluids (e.g., as optical and electromagnetic waveguides).

However, the existing microfluidic sensors suffer from one or more shortcomings, such as being influenced by environmental effects, and/or insufficient pressure sensitivity and resolution.

Accordingly, the present invention provides ultrahigh levels of pressure sensitivity and resolution, while overcoming numerous environmental sensitivity issues of prior microfluidic sensors.

BRIEF SUMMARY OF THE INVENTION

A droplet-based capacitive pressure sensing device is described which utilizes an elastic electrolyte-electrode contact with large interfacial capacitance that achieves ultrahigh sensitivity and resolution (e.g., 1.58 µF/kPa and 1.8 Pa, respectively). In addition, the inventive pressure sensor is simple to fabricate, has mechanical flexibility, optical transparency, while being insensitive to both evaporation and thermal noise.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

1. Introduction.

The inventive droplet-based capacitive pressure sensor mechanism is described utilizing a highly capacitive electric double layer (EDL) presented at an extremely flexible droplet-electrode interface. In particular, the device may be implemented on a simple suspended membrane structure, the EDL offers high charge density at the nanoscopic ionic-electronic interface to establish an ultrahigh interfacial capacitance, while the elastic deformability of electrolyte droplets on hydrophobic-modified electrodes allows reversible fluidic expansion/contraction, in response to external mechanical stimuli (i.e., pressure). The interfacial droplet sensor achieves an ultrahigh pressure sensitivity of 1.58

μF/kPa along with ultrahigh resolution of 1.8 Pa, which is comparable to the highest values reported in the literature. In addition, the response time of the sensing device (e.g., 260 ms) has been characterized under a constant membrane deformation (e.g., of 50 μm). The present invention also illustrates that through changes of the fluidic medium (e.g., lower viscosity) or modified surface energy (e.g., increased hydrophobicity), the mechanical response can be improved significantly.

The droplet sensing device is comprised of two flexible polymer membranes with conductive coating and a separation layer with a sensing chamber hosting the electrolyte droplet, which can be optically transparent and mechanically flexible. Moreover, adding glycerol to a highly conductive electrolyte droplet, such as at least 25% or more, addresses the primary evaporative concern with long-term stability for such a liquid-based sensor under room condition (46% humidity and 24° C.). Theoretical analyses and experimental investigations on key design parameters (i.e., the radius and height of the sensing chamber and droplet size) have been thoroughly conducted to characterize and optimize the overall device performance. Furthermore, the performance of the droplet sensors under different temperatures and humidity levels upon reaching thermodynamic equilibrium has been investigated. As a proof of applicability, the droplet-based capacitive pressure sensor was successfully applied to detect minute blood pressure variations on the skin surface (with the maximum value less than 100 Pa) throughout cardiovascular cycles.

2. Operating Principles.

The electric double layer (EDL) provides a large capacitance per unit area at the nanoscopic interface between an electrode and electrolyte (as high as tens of $\mu F/cm^2$). Several theoretic models have been proposed to explain the high levels of interfacial capacitance, established by mobile electrons in a conductive solid phase and counter-ions immigrating in the adjacent liquid environment. The interfacial capacitance is influenced by the surface charge density and Debye length, which is used to describe the thickness of the EDL when electrostatic and thermodynamic activities reach equilibrium in the solution phase. Surface charge density is influenced by the physiochemical property of the interface, kinetic energy of the ionic species, electric potential as well as permittivity and concentration of the solution.

Figure 1:
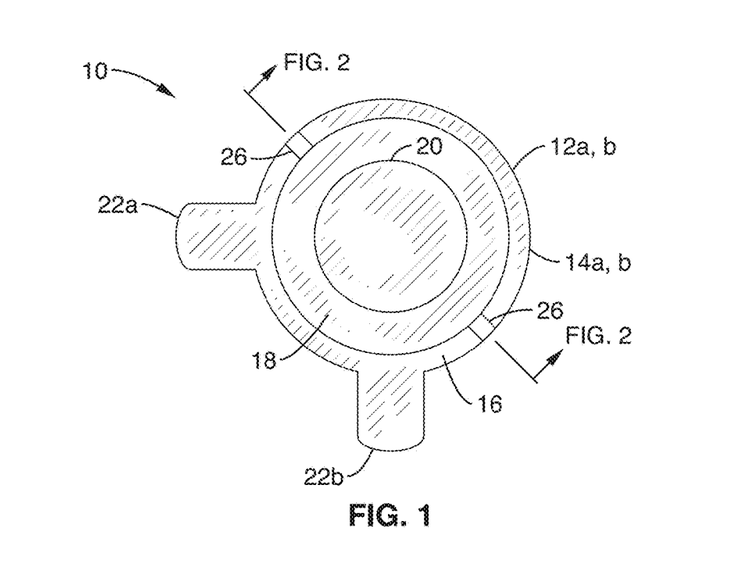
FIG. 1 is a top view of a droplet-based capacitive pressure sensor according to an embodiment of the present invention.
Figure 2:
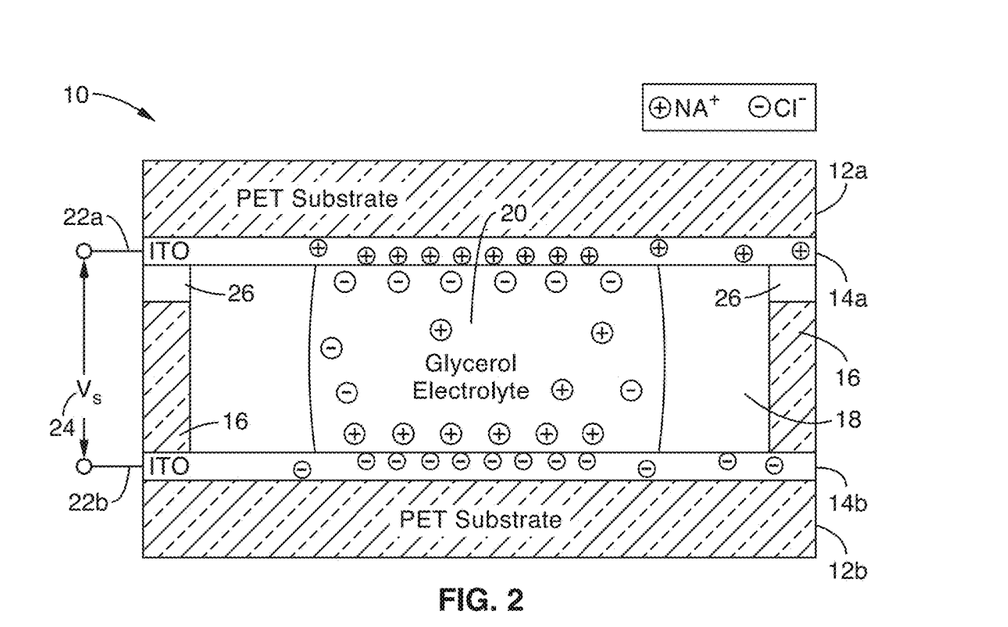
FIG. 2 is a cross-section view of the droplet-based capacitive pressure sensor seen in FIG. 1 according to an embodiment of the present invention.

FIG. 1 and FIG. 2 illustrate an example embodiment 10 of the inventive droplet-based capacitive pressure sensor which utilizes droplet-based interfacial sensing that achieves ultra-large interfacial EDL capacitance at the highly elastic droplet-electrode contact. The interfacial EDL capacitance of the sensor is proportional to the area of the contact interface, unlike the solid-state strain gauges, which measure the change of bulk resistance under mechanical deformation.

As can be seen in the top and cross-section views of FIG. 1 and FIG. 2, respectively, the sensor is bounded on top 12a, and bottom 12b with a substrate (e.g., Polyethylene Terephthalate (PET), or Polydimethylsiloxane (PDMS)) whose inner surfaces 14a, 14b are conductively coated (e.g., Indium-tin-oxide (ITO)) to facilitate an ultra-large interfacial capacitance in relation to the retained electrolytic fluid droplet 20 (e.g., glycerol electrolyte). It should be appreciated that at least one of the layers (top or bottom) along with its conductive coating must be flexible, that is to say deformable, whereby applied pressure can deform the membrane and the retained droplet. Sidewalls 16 (e.g., Polydimethylsiloxane (PDMS)) are interposed between the inner surfaces 14a, 14b to complete encapsulation of the pressure sensor leaving gaps 18 (e.g., air or other gaseous dielectric) between fluid droplet 20 and sidewalls 16. In the example embodiment, the two layer structure is shown in a circular plan form, although it should be appreciated that other shapes (e.g., any bounded geometric shapes or combination of shapes, including square, rectangular, other polygons, oblong, freeform, etc.), can be utilized to retain the droplet between the upper and lower surfaces within its surrounding. Contacts 22a, 22b are seen in FIG. 1 exemplified as conductive tabs extending from device 10, while in FIG. 2 the contacts are shown schematically in relation to sensing voltage 24 $V_s$.

In considering FIG. 2, the principle of droplet-based interfacial capacitive sensing can be more readily discerned. Sensing chamber 18 within the elastic separation layer hosts an electrolyte droplet 20, which is sandwiched between the two membranes (e.g., polymeric) 12a, 12b with inner surfaces coated with conductive material 14a, 14b, which is preferably transparent. An electric double layer (EDL) forms immediately upon the droplet-electrode contact (i.e., 14a-20-14b), with mobile electrons migrated from the conductive membrane surface and a counter-ion layer accumulated from the electrolyte solution in response to application of sensing voltage $V_s$ as seen in the figure.

Ventilation channels 26 (vent) are shown in FIG. 1 and FIG. 2 extending through portions of sidewalls 16, into gap 18 between the sidewall and droplet, which provides pressure equalization in response to deflection of the membrane. It should be appreciated that these vents 26 can be implemented in a number of different ways without departing from the teachings of the present invention. Alternatives include a plurality of smaller vents in sidewalls 16 (e.g., laser cut), or a sufficiently porous material in constructing sidewalls 16, and so forth. In addition, the vents can be configured in the upper and/or lower membranes. The preferred type and location for the vents can depend on both the composition of the electrolyte droplet and the application to which the sensor is being utilized.

Under the application of an external mechanical load, the suspended polymer membranes and the separation layer deforms elastically, and as a result, the contact area of the droplet-electrode interface experiences circumferential expansion (assuming incompressible fluid with unaltered volume of the droplet). Given a relatively constant charge density, the variation in the contact area results in a proportional change in the interfacial capacitance.

Figure 3:
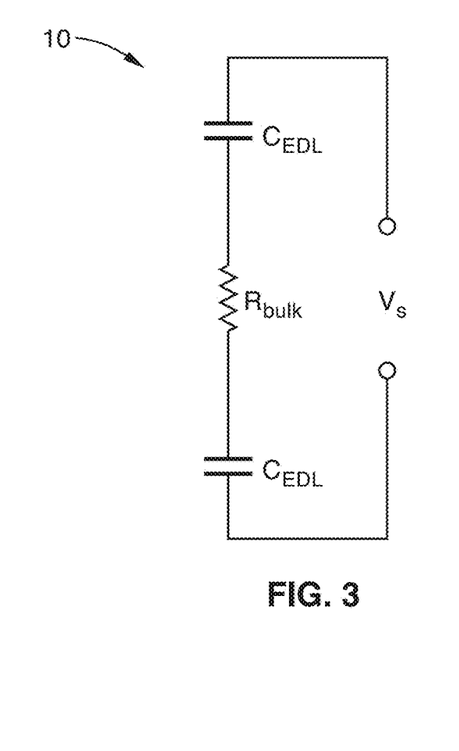
FIG. 3 is a schematic of an equivalent circuit of the droplet-based capacitive pressure sensor according to an embodiment of the present invention.

FIG. 3 illustrates an equivalent circuit 10 for the sensing structure shown in FIG. 1 and FIG. 2. In this equivalent circuit, the EDL capacitances ($C_{EDL}$) at the droplet-electrode interfaces are modeled as two capacitors connected through a resistive element ($R_{bulk}$) expressing the bulk resistance of the conductive droplet, and showing sensing voltage contacts $V_s$. The overall deformation of the sensing chamber, which includes the deflection of the flexible membrane and the compression of the elastic separation layer, leads to a change of interfacial contact area, and therefore changes the capacitance of the device.

More specifically, small deflections of these membranes can be mathematically predicted according to the classic thin-plate theory, while elastic deformation of the separation layer is well adapted to the linear strain-stress relationship. As aforementioned, the unit area capacitance ($c_o$) of the EDL can be considered as an experimentally determined constant. Therefore, the overall interfacial EDL capacitance ($C_{EDL}$) can be simply calculated from the product of the unit area capacitance and the droplet-electrode contact area. The mechanical-to-electrical sensitivity of the sensing device can thus be analytically expressed as:

$$\frac{\Delta C_{EDL}}{P} = c_o(\alpha R^2 + \beta H)\frac{V_d R^2}{H^2}$$

where P is mechanical load, $\alpha$ and $\beta$ represent membrane deflection and elastic deformation of the separation layer, respectively, and can be determined by the geometrical and mechanical properties of the sensing membrane and the separation layer. The values R and H represent radius and height of the sensing chamber, respectively, while $V_d$ indicates the volume of the electrolyte droplet. As can be seen, both the membrane deflection (1st term) and separation layer deformation (2nd term) contribute to the overall mechanical-to-capacitive sensitivity. It should be recognized that both the hydraulic pressure of the droplet and the radius of the curvature at the droplet-electrode interface have been ignored in the simplified mathematical expression. In addition, gravitational effects have been ignored, since the droplet volume is typically confined to be smaller than the cube of the capillary length, within which the capillary force is dominant. It should be appreciated that within the capillary length, the capillary force is dominant, while beyond the capillary length, gravity becomes more important.

3. Materials and Methods.

3.1 Surface Modification.

In at least one example embodiment of the device, indium-tin-oxide (ITO)-coated (100 nm thick) polyethylene terephthalate (PET) films (125 µm thick) were utilized to serve as pressure sensing membranes as well as to establish the interfacial droplet-electrode contact in the device. The ITO coated substrate exhibited excellent optical clarity, with a transmission coefficient of 80.9% at visible wavelengths, a high electrical conductance (sheet resistance of 50Ω/☐ (ohms/square)), and strong mechanical properties (Young's modulus of 3-4 GPa).

In order to reduce the hysteresis of droplet deformation, simple surface modification was introduced to the conductive coating. In brief, ITO-coated PET sheets were exposed to oxygen plasma at 30 watts (W) for 30 seconds to induce surface hydroxylation. Following plasma activation, a PDMS stamp, made from a mixture of a base and a curing agent at 10:1 weight ratio (SYLGARD 184® from Dow Corning®) and thermally cured at 80° C. for 2 hours was brought into physical contact with the conductive coating enriched with hydroxyl groups for 2 hours, during which a nanometer-thick layer of PDMS oligomers was transferred and immobilized onto the electrode surface. In addition, an indented hole (e.g., of 200 µm in diameter) was included in the center of the PDMS stamp, leaving a hydrophilic spot surrounded by the hydrophobic oligomer layer on the electrode surface, by which the sensing droplet is preferably anchored and stabilized in the middle of the sensing chamber. For the sake of enhancement of the surface hydrophobicity and thereby reduction of the droplet response time, a superhydrophobic nanocomposite material (e.g., PFC M1604V, FluoroPel™) was spray-coated onto the PDMS-oligomer-modified ITO surface. The commercial superhydrophobic coating was measured with water contact angle (CA) of 155°.

3.2 Device Fabrication.

The inventive droplet-based capacitive pressure sensors can be readily fabricated in a number of alternative ways. In one embodiment, the devices were fabricated utilizing direct laser micromachining which provided a facile approach to form the geometrical shape of the sensing membranes as well as the PDMS separation layer containing a sensing chamber in one single step. Specifically, a desktop $CO_2$ pulsed laser engraver can be utilized with a graphic user interface (e.g., CorelDraw or Photoshop) to perform the laser-etching process. Various power intensities from 0.3 W to 3 W were applied to trim ITO-coated PET or PDMS substrates of different thicknesses, from which a minimal feature resolution of 100 µm was reliably achieved. One or more ventilation channels were formed in the sensor chamber, being preferably engraved through the PDMS separation layer to maintain pneumatic pressure balance during chamber deformation. In a subsequent step, the laser-trimmed PET substrates with ITO coating were imprinted with PDMS oligomers as previously described and bonded to the PDMS separation layer through oxygen plasma-assisted bonding (e.g., at 90 W for 30 seconds). Prior to final assembly of the device, an electrolyte droplet with a desired volume was dispensed by a micropipette in the center of the sensing chamber.

3.3 Electrical and Mechanical Characterization.

Interfacial capacitance of the EDL layer can be assessed electrically, such as by utilizing a capacitance meter or multi-meter (e.g., inductance-capacitance-resistance (LCR) meter). At the AC excitation voltage of 0.5V applied to $V_s$ seen in FIG. 2 and FIG. 3, the interfacial capacitor was connected to the LCR meter in a bipolar configuration, sweeping from 20 Hz to 100 kHz for acquiring sub-MHz responses of the EDL layer. A high-speed digital camera (e.g., up to 1,200 frames per second) was used to capture the shape change of the droplet in order to measure droplet transient mechanical response. External mechanical point loads were applied onto the center of the sensing membrane through a custom-built motorized force gauge with 1 mN resolution, driven by a computer-controlled step motor with a sufficiently fine spatial resolution (e.g., 0.2 µm). The mechanical-to-capacitance responses were evaluated twice on two identical devices for each parameter. For the resolution measurement, minute droplets (e.g., 50 µL volume) dispensed by a micropipette were applied directly onto the sensing membrane until a noticeable capacitive change appeared in the LCR meter, which was evaluated three times for the same device.

4. Results.

4.1 Sensing Droplets.

In order to achieve the proper interfacial sensing, the physical properties of the sensing droplet should satisfy the following criteria: (a) high ionic concentration to ensure high electrical conductance and interfacial capacitance, (b) polarized molecular structure wherein hydrophobic surfaces have reversible elasticity, and (c) low fluidic viscosity which supports rapid mechanical response. Aqueous-based electrolyte solution (e.g., NaCl) with high ionic concentration are a simple choice, satisfying all criterion except for exhibiting moderate evaporation under normal room air conditions of temperature, pressure and humidity. Mixing an aqueous solution with an anti-evaporative agent, such as glycerol, effectively reduces evaporation due to decreased vapor pressure. However, glycerol is electrically non-conductive and has substantially higher viscosity than that of water (about 1,400 times greater). Therefore, an optimal mixing ratio of glycerol and electrolyte solution was sought in the inventive implementations.

Table 1 summarizes the physical and chemical properties of the electrolyte/glycerol mixture (given a NaCl solution at the concentration of 1.1 mol/L) at various mixing ratios (qv %), which includes electrical conductivity, unit-area capacitance ($c_o$)) at 20 Hz, evaporation, viscosity ($\mu$), relaxation time (t) and contact angle ($\theta$) (all measured on PDMS oligomer-coated ITO surfaces). As can be seen in the table, the mixing ratio has a minimal influence on electrical conductivity and unit-area capacitance, except for pure glycerol. Importantly, the 25/75% mixture of electrolyte/glycerol presents no appreciable evaporation under a regular laboratory environment (46% humidity and 24° C.) after 24 hours, as compared to a pure glycerol sample, which becomes hygroscopic under the same condition. Moreover, adding more glycerol to the mixture drastically increases the dynamic viscosity from 1.0 to 1412 Pa·s, and the 25/75% mixture becomes 60 times more viscous than that of water, which considerably affects the relaxation time, shown in the table increasing 0.02 seconds to 0.28 seconds). In addition, glycerol and water have similar contact angles on the hydrophobic coating (i.e., PDMS oligomer-coated ITO surface), and as a consequence, various mixtures have similar contact angles presented on the hydrophobic surface.

In summary, considering the physical properties and evaporative stability of the mixtures, a mixture including at least 25% glycerol in the electrolyte of the droplet is preferred. More preferably, a 25/75% electrolyte/glycerol solution was found to be a preferred working fluid for the sensing droplet.

4.2 Surface Modification.

As described in a previous section, in at least one embodiment surface, hydrophobic treatment was applied to the conductive coating, toward ensuring reversible and elastic deformability of the sensing interface. As previously reported, an ultrathin layer of PDMS oligomers can be universally transferred and immobilized on a hydroxylated surface. The interfacial oligomer layer of approximate nanometer thickness (e.g., around 1-2 nm) does not significantly alter EDL upon electrolyte-electrode contact. The added oligomer layer beneficially presents substantially reduced interfacial energy.

Figure 4:
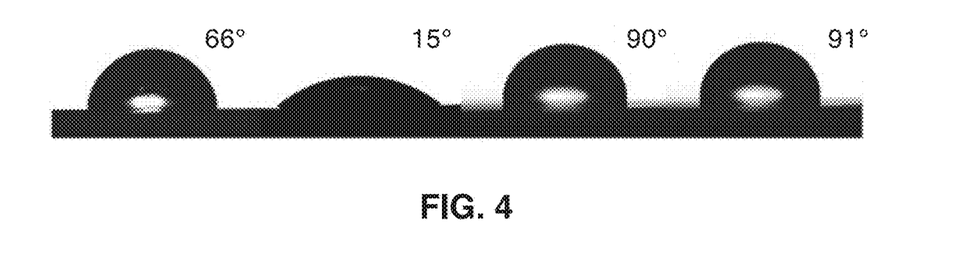
FIG. 4 is an image rendition of contact angles for various Indium-tin-oxide (ITO) surfaces utilized according to an embodiment of the present invention.

FIG. 4 depicts the variation in surface energy during the oligomer transfer process, by measuring the contact angle of a mixed electrolyte/glycerol solution (25/75%). In the far left of this figure a droplet is seen on the ITO coating with a contact angle of 66°. With an oxygen-plasma treatment, the ITO-OH coating renders apparent hydrophilicity to the surface and contact angle reduces from 66° to 15°. Following the oligomer transfer step, the PDMS oligomer-coated ITO-PDMS oligomer surface switches the polarity from hydrophilicity to hydrophobicity with a contact angle of 90° being achieved, which further enhances the elasticity and reversibility of the droplet-electrode contact by reducing adhesive energy of the liquid to the substrate. A control is seen at the far right of pure electrolyte solution on the oligomer coated ITO surface.

4.3 Interfacial Capacitance.

The EDL capacitance, established by mobile electrons at the conductive solid surface and a counter-ion layer accumulated in the electrolyte solution, is frequency-dependent in nature with several mechanisms associated (e.g., electrophoresis and interfacial polarization).

Figure 5:
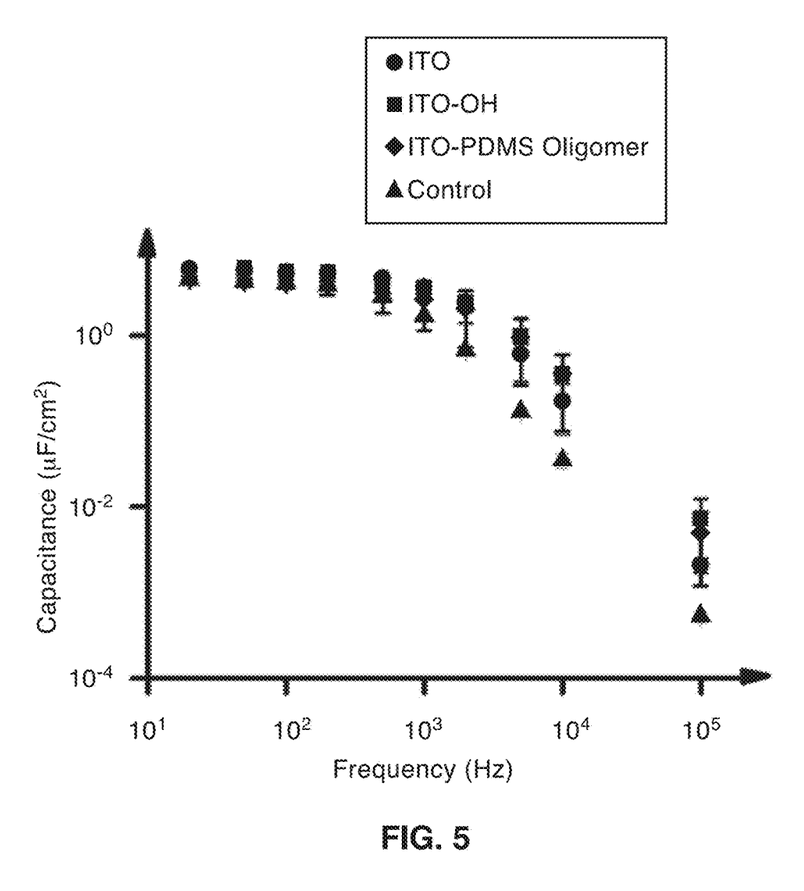
FIG. 5 is a graph of capacitance with respect to frequency for the various ITO surfaces depicted in FIG. 4.

FIG. 5 compares the frequency responses of the electrolyte mixture on the original ITO surfaces in relation to the modification seen in FIG. 4. As expected, the surface modifications have marginal influence on the interfacial EDL capacitance, and it is most likely that neither surface hydroxylation nor oligomer transfer alters the physical separation between the electrolyte and electrode interface. Moreover, in a control experiment, a pure electrolyte solution (given NaCl at the concentration of 1.1 mol/L) exhibits a similar frequency response to that of the electrolyte mixture on the PDMS oligomer modified surface within the sub-MHz range, which reconfirms that the mixture maintains sufficient electrical properties at the interface. In this study, it was also determined that the measured unit area capacitance was consistently lower than previously reported, which is possibly due to the molecular structure of the ITO layer prepared by different coating techniques.

4.4 Mechanical-to-Capacitive Sensitivity.

As presented in the section on operating principles, the overall mechanical-to-electrical sensitivity ($\Delta C_{EDL}/P$) can be determined by the geometrical confinements (the radius R and height H of the sensing chamber and the thickness of the polymeric membrane), droplet volume ($V_d$), and the material properties of the construct (Young's modulus and Poisson's ratio), given a fixed unit-area capacitance ($c_o$). Among those parameters, the radius of the sensing chamber generally comprises the more important role (4th power in membrane deflection) as the theory predicted, followed by the height of the chamber (inverse 2nd power in membrane deflection). In addition, the system sensitivity was found to be directly proportional to the volume of the sensing droplet. Experimental investigations have been conducted to verify the above theoretical predictions.

4.5 Influence of Chamber Radius.

Figure 6A:
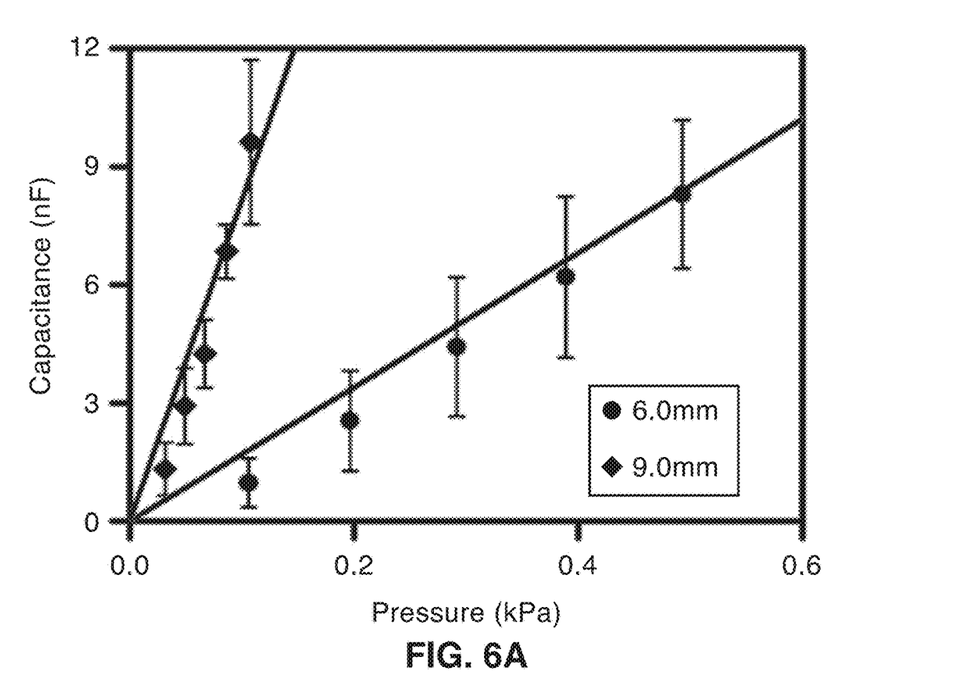
FIG. 6A through FIG. 6D are graphs of capacitance with respect to pressure for various pressure sensing geometrical characteristics utilized according to one or more embodiments of the present invention.
Figure 6B:
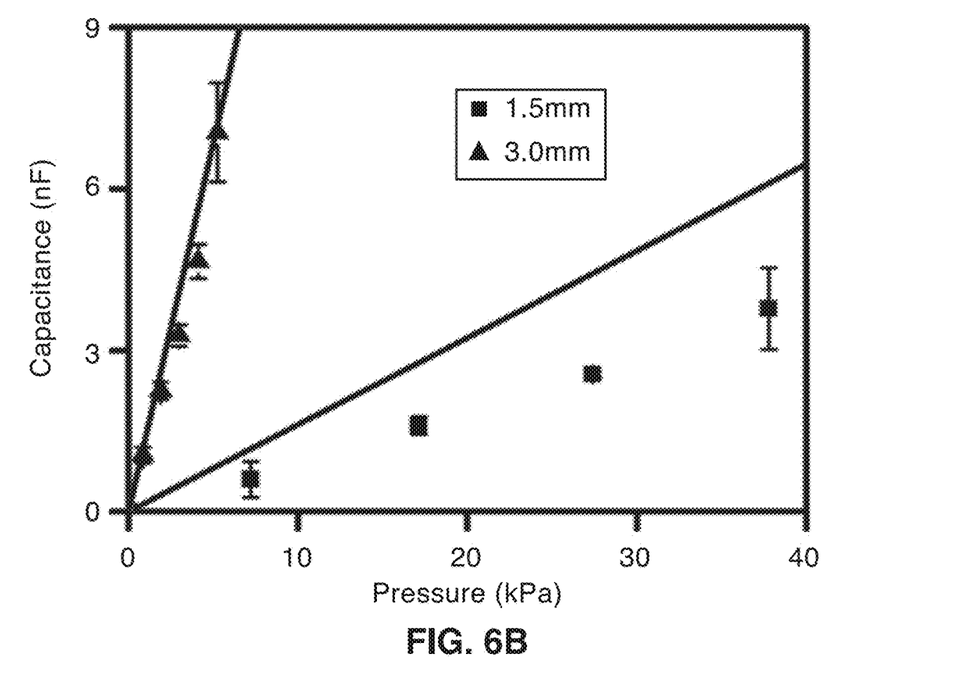

FIG. 6A and FIG. 6B depict capacitive changes over a wide spectrum of pressure loaded on the droplet sensors with different sensing chamber sizing, whose radius was varied from 1.5 to 9.0 mm, given a chamber height of 200 μm and the droplet volume of 0.3 μL. The experimental measurements (dots) were plotted in comparison with the values calculated from Eq. 1 (curves), and the slope rate of each device measurement defines the corresponding device sensitivity. As predicted by the sensing theory, the radius exhibits 4th power in membrane deflection and 2nd power in the elastic deformation, which has a significant effect on the system sensitivity. Within the small deflection limit, the capacitive charges change linearly with the external load as one would expect. In the devices with the largest sensing chamber (of 9.0 mm radius), the highest sensitivity of 90.2 nF/kPa was achieved, as seen in FIG. 6A. In comparison, as the radius is reduced to two thirds of its former value (6.0 mm), the system sensitivity drops drastically to less than 20% of that (17.2 nF/kPa) which closely correlates with our theoretical prediction, i.e., the sensitivity is directly proportional to the 4th power of radius, as the membrane deflection dominates the overall mechanical deformation. The above data suggests that the theoretical model fits the experiments reasonably well under the assumptions. In both cases, the contact area between the droplet and the deformed membrane is smaller than 5% of the whole chamber area, and therefore can be approximated as a flat interface instead of curved. However, in the smallest devices (with a radius of 1.5 mm), the measurements deviate considerably (more than 40%) from the stimulated values. In this case it is highly possible that the small deformation limit, which is associated with the ratio of the maximum deflection to the radius of the membrane, has been exceeded. In addition, it has been observed that the radius of the curvature of the deflected membrane can no longer be ignored in the smallest sensing unit. Overall, the radius of the chamber is a determinant factor for the overall mechanical-to-electrical sensitivity, given its 4th power relation, as the membrane deflection serves as the primary mechanical deformation mechanism under external load.

4.6 Influence of Chamber Height.

As predicted by the theoretical analysis, the device sensitivity is inversely proportional to the 2nd power of the height of the sensing as the membrane deflection dominates, and thus, a lower sensing chamber will lead to a larger contact area at a given droplet volume.

Figure 6C:
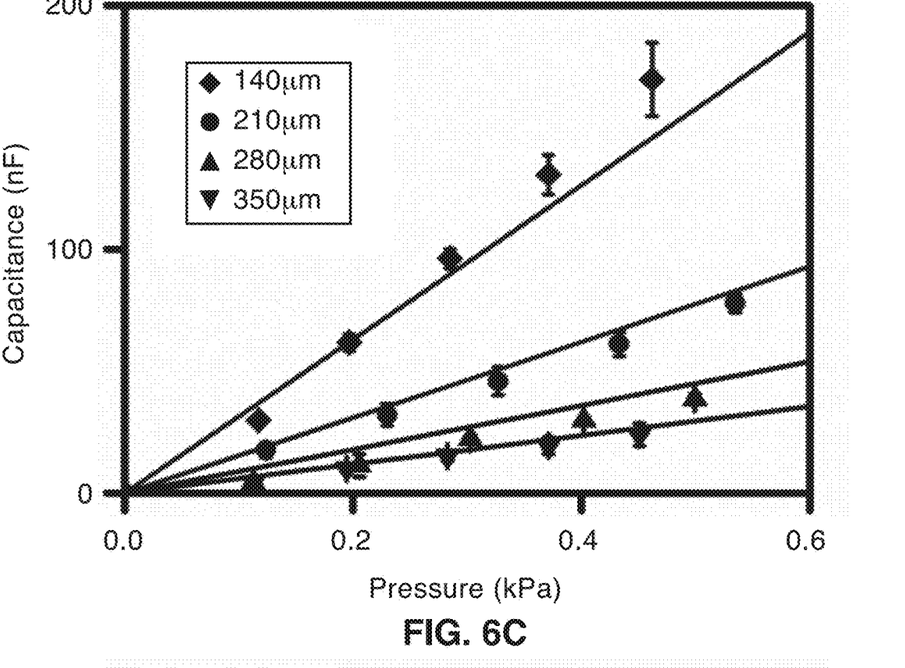

FIG. 6C depicts sensitivity variations over four different chamber heights (140 μm, 210 μm, 280 μm and 350 μm) provided with a chamber radius of 6.0 mm and droplet volume of 3 μL. As can be seen, the shortest chamber (140 μm in height) shows the highest sensitivity (374 nF/kPa) due to the presence of the largest contact area at the droplet-electrode interface. As the height of the chamber is increased from 140 μm to 210 μm, the device sensitivity decreases from 374 nF/kPa to 144 nF/kPa, closely following the negative quadratic relationship between the sensitivity and the chamber height. The tallest chamber of 350 μm exhibits the lowest level of sensitivity at 54.5 nF/kPa. Moreover, as chamber height increases, the separation layer becomes increasingly influential on the overall sensitivity. In another words, the thicker separation layer produces more substantial deformation under the same load according to the linear strain-stress relationship. However, in the exemplified range of height, the maximal deformation of the separation layer is still one order of magnitude smaller than that of the membrane deflection as expected. In brief, all four sets of the sensitivity measurements are in close agreement with the theoretical analysis presented above.

4.7 Influence of Droplet Volume.

It should also be appreciated that droplet volume is directly proportional to system sensitivity. In general, a larger droplet covers more interfacial area with a longer circumferential periphery along the contact, which leads to a higher sensitivity given constant dimensions of a sensing chamber. However, the increased droplet size can also lead to non-linear response as the droplet-electrode interface can no longer be approximated as a planar surface.

Figure 6D:
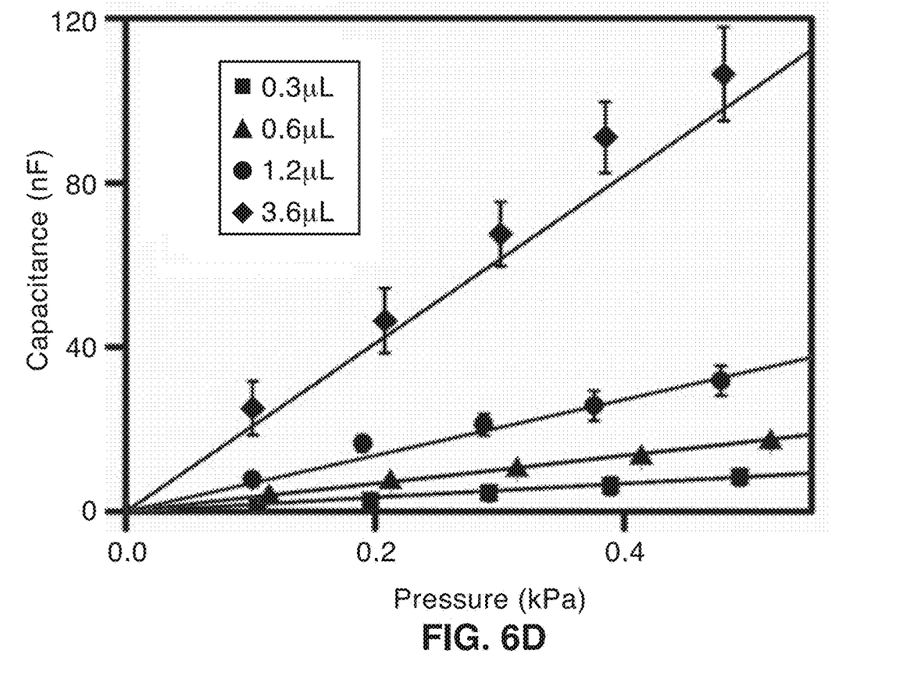

FIG. 6D depicts four different droplet sensing volumes of 0.3 μL, 0.6 μL, 1.2 μL and, 3.6 μL, respectively, characterized and compared under identical sensing chamber dimensions (6.0 mm radius and 200 μm height). It can be seen from the figure, that as droplet volume increased from 0.3 μL to 0.6 μL, and then to 1.2 μL, the corresponding sensitivity rose in a linearly proportional manner from 17.2 nF/kPa to 32.1 nF/kPa, and then to 65.7 nF/kPa. The highest sensitivity (218 nF/kPa) was achieved on the sensing droplet of 3.6 μL in volume. These findings re-confirm the applicability of Eq. 1.

4.8 Optimization of Device Sensitivity.

An embodiment of the present invention was optimized in response to the above observations. Accordingly, the device optimized for sensitivity is 9.0 mm in radius, 140 μm in height and 3 μL in droplet volume which provided sensitivity of 1.58 μF/kPa, which closely compares with the highest value we found reported in the literature, which was 2.24 μF/kPa and which relied upon a mercury droplet in combination with an ultrahigh permittivity material. In addition to the design parameters discussed above, the thickness of the polymeric membrane is another crucial parameter in determining sensing performance. Sensitivity caused by membrane deformation is inversely proportional to the cubic power of its thickness. In this study, we have been using the off-the-shelf ITO-coated substrate (125 μm in thickness); however, further reducing the membrane thickness could lead to drastic increases in device sensitivity. Moreover, in the optimal sensing design, the device shows an extremely high pressure resolution of 1.8±0.4 Pa.

4.9 Response Time.

Response time serves as another critical measure for mechanical sensing devices in addition to their sensitivity and resolution. In general, the response time of such a droplet-based sensor can be influenced by the viscosity of the droplet medium, the hydrophobicity of the electrode surface, and the elasticity of the PDMS separation layer and the PET membrane, of which the liquid viscosity and surface hydrophobicity dominate. Accordingly, we have further characterized the response time of the geometrically identical sensing devices with varied droplet viscosity and surface hydrophobicity under the same level of the membrane deformation of 50 μm.

Figure 7A:
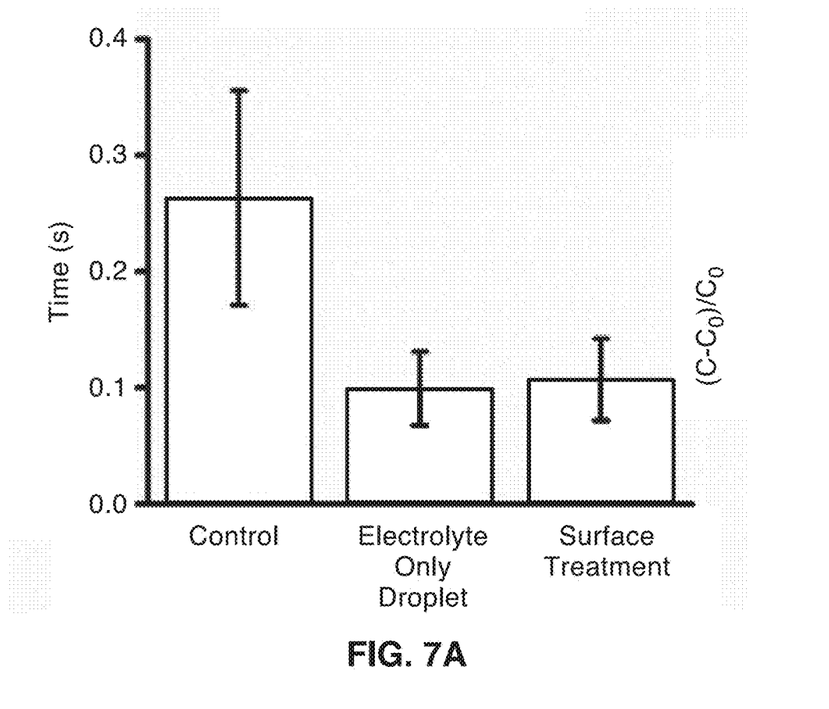
FIG. 7A through FIG. 7C are graphs of response and environmental influence comparing different droplets utilized according to an embodiment of the present invention.

FIG. 7A depicts response times for different droplet systems, comparing a control (far left) with an electrolyte only droplet (center), and a droplet with surface treatment (far right). As can be seen, the response time is around 260 ms for a control droplet in an optimized sensing design having a chamber of 6 mm in radius and 140 μm in height and the volume of the droplet is 3 μL. With decreased droplet viscosity (from 60 Pa·s of the 25/75% electrolyte/glycerol mixture to 1 Pa·s of a pure electrolyte solution) and the enhanced surface hydrophobicity (from CA of 90° to 155°) can lead to more than two-fold reduction in the response time (to around 100 ms). However, the pure electrolyte solution is subject to evaporation effects, while converting the electrolyte surface from hydrophobic to superhydrophobic introduces a micrometer-thick (around 10 μm) dielectric layer, which substantially lowers interfacial capacitance.

4.10 Influences of Temperature and Humidity.

Importantly, the performance of the droplet sensors can be highly subject to environmental humidity level. Specifically, the electrolyte/glycerol mixture establishes thermodynamic equilibrium with different stable mixing ratios at different humidity levels by either losing (evaporation) or gaining (condensation) aqueous contents to/from the environment.

Figure 7B:
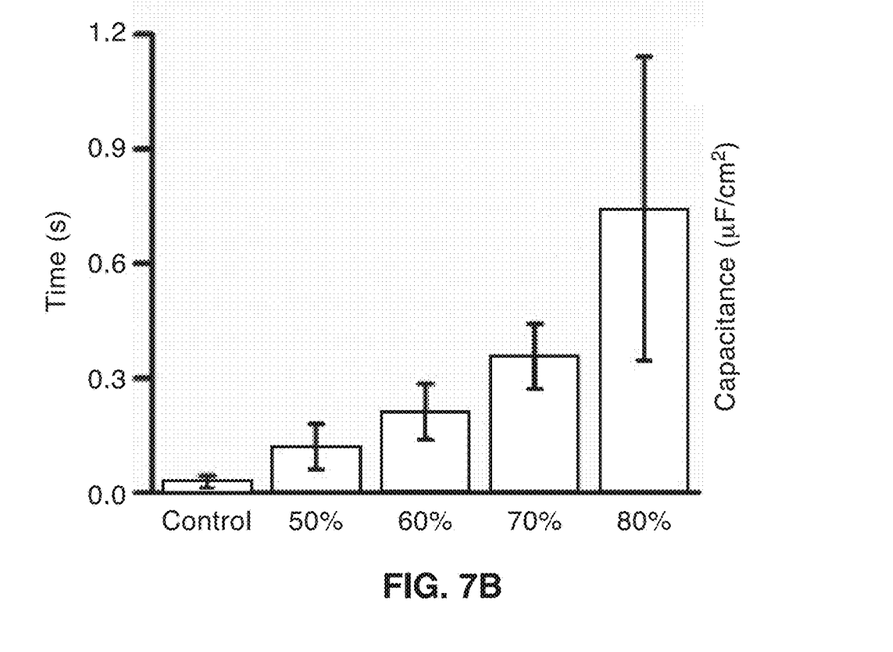

FIG. 7B depicts sensitivity in relation to changing humidity levels, seen in a control at room conditions having humidity of 46%, and at humidity levels of 50%, 60%, 70% and 80%. It will be appreciated that the volume and capacitance of a droplet sensor can substantially deviate from the initial condition (of 25/75% electrolyte/glycerol) as the mixture compositions changes. In other words, as the humidity level rises, the volume of the droplet would likely increase as additional moisture condensates into the mixture. However, once a new thermodynamic equilibrium is established, the capacitance will remain stable. Therefore, in practice one can either employ sensing elements with different mixing ratios at different humidity levels, or allow the sensing element to equilibrate with the environment thermodynamically prior to its usage.

In contrast, the environmental temperature fluctuation has only posed minor influence on the interfacial capacitance, in comparison with the resistance-based devices.

Figure 7C:
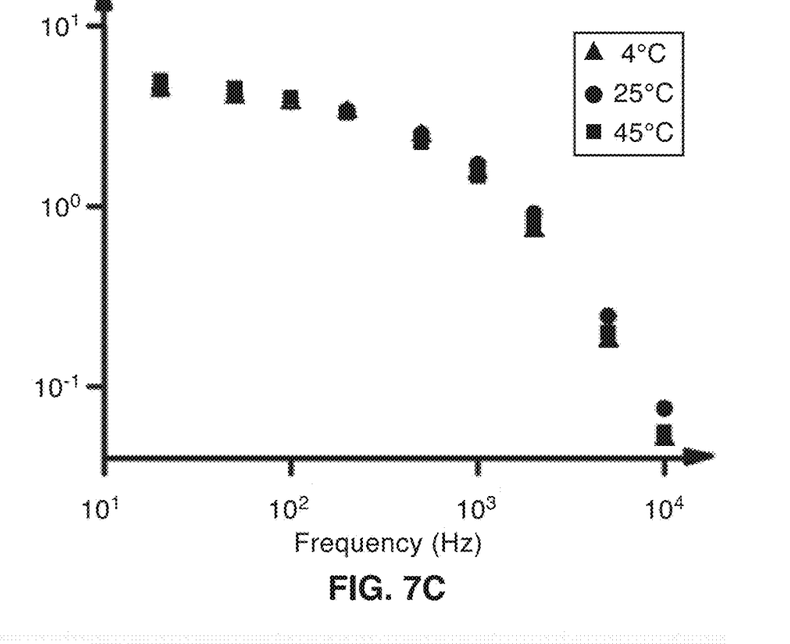

FIG. 7C depicts electrolyte-electrode interfacial capacitance measured at three separate temperatures of 4° C. (reduced), 25° C. (regular), and 45° C. (elevated), respectively, from which less than 10% variation in the unit-area capacitance has been observed at the steady state. In comparison, within the same range of temperature fluctuation, the resistance measurement can fluctuate up to 55% in what we've seen on pressure sensing devices reported in the literature.

5. Demonstration of Example Application.

To demonstrate the utility of the simply constructed and mechanically flexible droplet sensor with ultrahigh sensitivity and resolution, the device was applied to recording blood pressure variations on the skin surface. In this dynamic measurement, a droplet sensor was devised with a built-in chamber size of 6 mm in radius and 140 μm in height, containing an electrolyte droplet of 3 μL as the sensing element to achieve a facilitated response (with the response time of 100 ms).

The sensor was attached to the skin surface above the carotid artery to record blood pressure wave profiles with a gentle contact force being applied.

Figure 8:
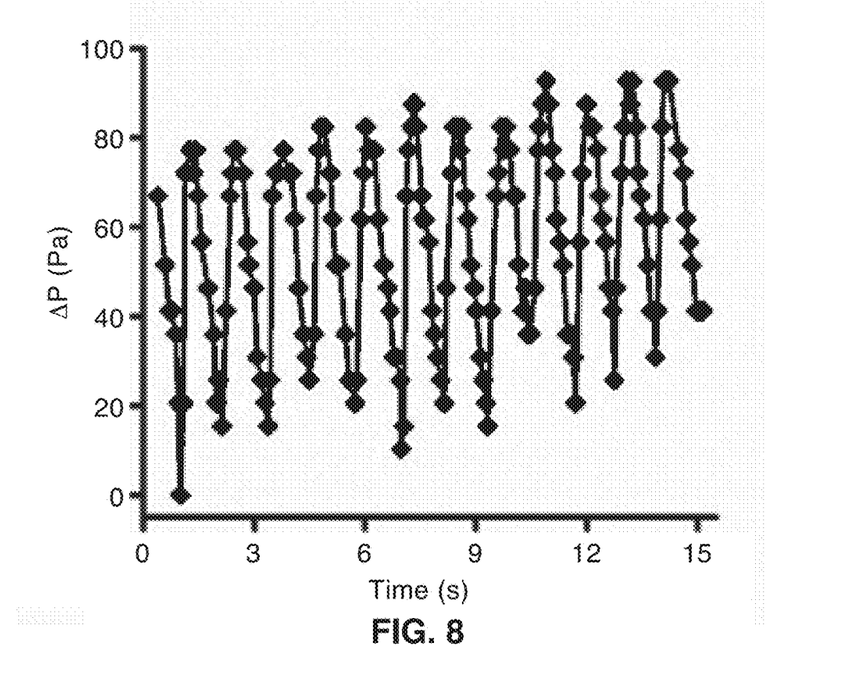
FIG. 8 is a graph of blood pressure variation determined with the droplet-based capacitive pressure sensor according to an embodiment of the present invention.

FIG. 8 depicts the minute blood pressure variations which were recorded with the inventive pressure sensor having maximum pressure values less than 100 Pa at around 1 Hz. In view of the ultrahigh sensitivity and resolution, as well as having simple fabrication and flexible construction; the inventive droplet-based capacitive pressure sensor should prove attractive to a wide range of applications, while being particularly well-suited for biomedical applications (e.g., ocular systems, pulmonary, and cardiovascular). It will be appreciated that in most biomedical applications maximal pressure variations typically range from 2 kPa to 20 kPa, while there is a need for devices that are body conformable and comfortable to allow for continuous pressure monitoring. In addition, the inventive sensors are substantially insensitive to evaporation when using the preferred electrolyte/glycerol mixture, and are substantially insensitive to thermal noises, which is a substantial benefit over the use of resistive-based sensor schemes.

From the discussion above it will be appreciated that the invention can be embodied in various ways, including the following:

1. A droplet-based capacitive sensor apparatus, comprising: a sensing chamber within an interior volume of a housing having a first and second substrate between which are disposed a substrate separation structure maintaining a periphery of said first and second substrates at a fixed separation distance to form said sensing chamber; wherein at least one of said first or second substrates is flexible; a conductive surface coating on the interior surfaces of said first substrate and said second substrate to form a first electrode and a second electrode; and an electrolyte droplet retained in said sensing chamber in contact with said first and second electrodes and leaving a gap between said electrolyte droplet and said substrate separation structure; wherein contact between said electrolyte droplet and said first and second electrodes form electric double layers (EDL) having interfacial EDL capacitance proportional to interface contact area which varies in response to mechanical pressure applied to deform at least one of said substrates which is flexible.

2. The apparatus of any previous embodiment, wherein a portion of said first substrate, or said second substrate, or a combination of said first and second substrate, centrally disposed in said housing, is modified to be hydrophilic toward centrally anchoring said electrolyte droplet within said housing.

3. The apparatus of any previous embodiment, wherein a portion of said first substrate, or said second substrate, or a combination of said first and second substrate, disposed near the periphery of said housing, is modified to be hydrophobic toward enhancing central anchoring of said electrolyte droplet within said housing.

4. The apparatus of any previous embodiment, wherein a depression is formed in a central portion of said first substrate, or said second substrate, or a combination of said first and second substrate, toward centrally anchoring said electrolyte droplet within said housing.

5. The apparatus of any previous embodiment, wherein said electrolyte droplet contains at least 25% glycerol.

6. The apparatus of any previous embodiment, wherein at least a portion of said first and second substrates, having the conductive surface coating on said first and second electrodes, extends beyond said housing to provide electrical connection with said first and second electrodes.

7. The apparatus of any previous embodiment, wherein mobile electrons migrate from said first and second electrodes and a counter-ion layer accumulates from the electrolyte droplet in response to application of a sensing voltage to said first and second electrodes.

8. The apparatus of any previous embodiment, wherein said housing and electrolyte droplet are sized to leave a sufficient gap between said electrolyte droplet and said separation structure to allow deformation of the electrolyte droplet at maximum sense pressure without contacting said substrate separation structure.

9. The apparatus of any previous embodiment, wherein said first substrate, or said second substrate, or both said first and second substrates comprise a polymer membrane.

10. The apparatus of any previous embodiment, wherein said polymer membrane comprises polyethylene terephthalate (PET).

11. The apparatus of any previous embodiment, wherein said separation structure comprises a polymeric material.

12. The apparatus of any previous embodiment, wherein said separation structure comprises a polydimethylsiloxane (PDMS).

13. The apparatus of any previous embodiment, wherein said conductive surface coating comprises indium tin oxide (ITO).

14. The apparatus of any previous embodiment, wherein said first substrate to which is attached said first electrode, or said second substrate to which is attached said second electrode, or a combination of said first and second substrates and said first and second electrodes, comprise an optically transparent material.

15. The apparatus of any previous embodiment, wherein said separation structure comprises an optically transparent material.

16. The apparatus of any previous embodiment, further comprising one or more ventilation channels formed in said housing to maintain pneumatic pressure balance.

17. The apparatus of any previous embodiment, wherein said apparatus is configured for medical pressure sensing applications.

18. A droplet-based capacitive sensor apparatus, comprising: a sensing chamber within an interior volume of a housing having a first and second substrate between which are disposed a substrate separation structure maintaining a periphery of said first and second substrates at a fixed separation distance to form said sensing chamber; wherein at least one of said first or second substrates is flexible; a conductive surface coating on the interior surfaces of said first substrate and said second substrate to form a first electrode and a second electrode; and an electrolyte droplet retained in said sensing chamber in contact with said first and second electrodes and leaving a gap between said electrolyte droplet and said substrate separation structure; wherein contact between said electrolyte droplet and said first and second electrodes form electric double layers (EDL) having interfacial EDL capacitance proportional to interface contact area which varies in response to mechanical pressure applied to deform at least one of said substrates which is flexible; and wherein one or more portions of said first substrate, or said second substrate, or a combination of said first and second substrate, are modified to be hydrophilic toward centrally anchoring said electrolyte droplet within said housing, or are modified to be hydrophobic near the periphery of said housing toward preventing said electrolyte droplet from moving into contact with said housing.

19. The apparatus of any previous embodiment, wherein a depression is formed in a central portion of said first substrate, or said second substrate, or a combination of said first and second substrate, toward centrally anchoring said electrolyte droplet within said housing.

20. The apparatus of any previous embodiment, wherein said electrolyte droplet contains at least 25% glycerol.

21. The apparatus of any previous embodiment, wherein at least a portion of said first and second substrates, having the conductive surface coating on said first and second electrodes, extends beyond said housing to provide electrical connection with said first and second electrodes.

22. The apparatus of any previous embodiment, wherein said housing and electrolyte droplet are sized to leave a sufficient gap between said electrolyte droplet and said separation structure to allow deformation of the electrolyte droplet at maximum sense pressure without contacting said substrate separation structure.

23. The apparatus of any previous embodiment, wherein said first substrate, or said second substrate, or both said first and second substrates comprise a polymer membrane.

24. The apparatus of any previous embodiment, wherein said separation structure comprises a polymeric material.

25. The apparatus of any previous embodiment, wherein said conductive surface coating comprises indium tin oxide (ITO).

26. The apparatus of any previous embodiment, further comprising one or more ventilation channels formed in said housing to maintain pneumatic pressure balance.

27. A droplet-based capacitive sensor apparatus, comprising: a sensing chamber within an interior volume of a housing having a first and second substrate between which are disposed a substrate separation structure maintaining a periphery of said first and second substrates at a fixed separation distance to form said sensing chamber; wherein a depression is formed in a central portion of said first substrate, or said second substrate, or a combination of said first and second substrate, toward centrally anchoring said electrolyte droplet within said housing; wherein at least one of said first or second substrates is flexible; a conductive surface coating on the interior surfaces of said first substrate and said second substrate to form a first electrode and a second electrode, which also extends beyond said housing to provide electrical connection with said first and second electrodes; and an electrolyte droplet retained in said sensing chamber in contact with said first and second electrodes and leaving a gap between said electrolyte droplet and said substrate separation structure; wherein mobile electrons migrate from said first and second electrodes and a counter-ion layer accumulates from the electrolyte droplet in response to application of a sensing voltage to said first and second electrodes; and wherein contact between said electrolyte droplet and said first and second electrodes form electric double layers (EDL) having interfacial EDL capacitance proportional to interface contact area which varies in response to mechanical pressure applied to deform at least one of said substrates which is flexible.

28. The apparatus of any previous embodiment, wherein one or more portions of said first substrate, or said second substrate, or a combination of said first and second substrate, are modified to be hydrophilic toward centrally anchoring said electrolyte droplet within said housing, or are modified to be hydrophobic near the periphery of said housing toward preventing said electrolyte droplet from moving into contact with said housing.

29. The apparatus of any previous embodiment, wherein said electrolyte droplet contains at least 25% glycerol.

30. The apparatus of any previous embodiment, wherein said conductive surface coating comprises indium tin oxide (ITO).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Physical Properties of Electrolyte/Glycerol Mixture

| (A) Mix Ratio | (B) Conducts? | (C) $c_0$ ($\mu F/cm^2$) | (D) Evap.? | (E) Viscosity | (F) Relax. T | (G) Contact ∠ |
|---|---|---|---|---|---|---|
| 100/0 | Y | 4.5 ± 0.14 | Y | 1.0 | 0.02 | 90.5 ± 0.71 |
| 75/25 | Y | 4.7 ± 0.22 | Y | 2.5 | 0.06 | 89.5 ± 0.71 |
| 50/50 | Y | 4.4 ± 0.32 | Y | 8.4 | 0.18 ± 0.02 | 86.0 ± 2.83 |
| 25/75 | Y | 4.4 ± 0.21 | N | 60.1 | 0.28 ± 0.02 | 89.5 ± 3.54 |
| 0/100 | N | — | N | 1412 | 2.29 ± 0.02 | 93.0 ± 1.41 |

(A) Mixing Ratio of the Electrolyte/Glycerol (v/v %)
(B) Is it Electrically conductive?
(C) Unit area capacitance $c_0$ ($\mu F/cm^2$)
(D) Subject to Evaporation?
(E) Viscosity $\mu$(Pa · s)
(F) Relaxation Time t(s)
(G) Contact Angle (degrees)

What is claimed is:
1. A humidity sensor apparatus, comprising:
a sensing chamber within an interior volume of a housing having a first and second substrate between which are disposed a substrate separation structure maintaining a periphery of said first and second substrates at a fixed separation distance to form said sensing chamber;
a conductive surface coating on the interior surfaces of said first substrate and said second substrate to form a first electrode and a second electrode; and
a deformable ionic material retained in said sensing chamber in contact with said first and second electrodes and leaving a gap between said ionic material and said substrate separation structure;

wherein contact between said ionic material and said first and second electrodes form electric double layers (EDL) having interfacial EDL capacitance which is influenced by ambient humidity to which the apparatus is exposed.

2. The apparatus recited in claim 1, wherein a portion of said first substrate, or said second substrate, or a combination of said first and second substrate, centrally disposed in said housing, is modified to be hydrophilic toward centrally anchoring said ionic material within said housing.

3. The apparatus recited in claim 1, wherein a portion of said first substrate, or said second substrate, or a combination of said first and second substrate, disposed near the periphery of said housing, is modified to be hydrophobic toward enhancing central anchoring of said ionic material within said housing.

4. The apparatus recited in claim 1, wherein a depression is formed in a central portion of said first substrate, or said second substrate, or a combination of said first and second substrate, toward centrally anchoring said ionic material within said housing.

5. The apparatus recited in claim 1, wherein said ionic material contains at least 25% anti-evaporation agent.

6. The apparatus recited in claim 1, wherein at least a portion of said first and second substrates, having the conductive surface coating on said first and second electrodes, extends beyond said housing to provide electrical connection with said first and second electrodes.

7. The apparatus recited in claim 1, wherein mobile electrons migrate from said first and second electrodes and a counter-ion layer accumulates from the ionic material in response to application of a sensing voltage to said first and second electrodes.

8. The apparatus recited in claim 1, wherein said housing and ionic material are sized to leave a sufficient gap between said ionic material and said separation structure to allow deformation of the ionic material at maximum sense pressure without contacting said substrate separation structure.

9. The apparatus recited in claim 1, wherein said first substrate, or said second substrate, or both said first and second substrates comprise a polymer membrane.

10. The apparatus recited in claim 9, wherein said polymer membrane comprises polyethylene terephthalate (PET).

11. The apparatus recited in claim 1, wherein said separation structure comprises a polymeric material.

12. The apparatus recited in claim 11, wherein said separation structure comprises a polydimethylsiloxane (PDMS).

13. The apparatus recited in claim 1, wherein said conductive surface coating comprises indium tin oxide (ITO).

14. The apparatus recited in claim 1, wherein said first substrate to which is attached said first electrode, or said second substrate to which is attached said second electrode, or a combination of said first and second substrates and said first and second electrodes, comprise an optically transparent material.

15. The apparatus recited in claim 1, wherein said separation structure comprises an optically transparent material.

16. The apparatus recited in claim 1, further comprising one or more ventilation channels formed in said housing to maintain pneumatic pressure balance.

17. A droplet-based humidity sensor apparatus, comprising:
a sensing chamber within an interior volume of a housing having a first and second substrate between which are disposed a substrate separation structure maintaining a periphery of said first and second substrates at a fixed separation distance to form said sensing chamber;
a conductive surface coating on the interior surfaces of said first substrate and said second substrate to form a first electrode and a second electrode; and
a deformable ionic material retained in said sensing chamber in contact with said first and second electrodes and leaving a gap between said ionic material and said substrate separation structure;
wherein contact between said ionic material and said first and second electrodes form electric double layers (EDL) having interfacial EDL capacitance which is influenced by ambient humidity to which the apparatus is exposed; and
wherein one or more portions of said first substrate, or said second substrate, or a combination of said first and second substrate, are modified to be hydrophilic toward centrally anchoring said ionic material within said housing, or are modified to be hydrophobic near the periphery of said housing toward preventing said ionic material from moving into contact with said housing.

18. The apparatus recited in claim 17, wherein a depression is formed in a central portion of said first substrate, or said second substrate, or a combination of said first and second substrate, toward centrally anchoring said ionic material within said housing.

19. The apparatus recited in claim 17, wherein said ionic material contains at least 25% anti-evaporation agent.

20. The apparatus recited in claim 17, wherein at least a portion of said first and second substrates, having the conductive surface coating on said first and second electrodes, extends beyond said housing to provide electrical connection with said first and second electrodes.

21. The apparatus recited in claim 17, wherein said housing and ionic material are sized to leave a sufficient gap between said ionic material and said separation structure to allow deformation of the ionic material at maximum sense pressure without contacting said substrate separation structure.

22. The apparatus recited in claim 17, wherein said first substrate, or said second substrate, or both said first and second substrates comprise a polymer membrane.

23. The apparatus recited in claim 17, wherein said separation structure comprises a polymeric material.

24. The apparatus recited in claim 17, wherein said conductive surface coating comprises indium tin oxide (ITO).

25. The apparatus recited in claim 17, further comprising one or more ventilation channels formed in said housing to maintain pneumatic pressure balance.

26. A droplet-based humidity sensor apparatus, comprising:
a sensing chamber within an interior volume of a housing having a first and second substrate between which are disposed a substrate separation structure maintaining a periphery of said first and second substrates at a fixed separation distance to form said sensing chamber;
wherein a depression is formed in a central portion of said first substrate, or said second substrate, or a combination of said first and second substrate, toward centrally anchoring said ionic material within said housing; and
a conductive surface coating on the interior surfaces of said first substrate and said second substrate to form a first electrode and a second electrode, which also extends beyond said housing to provide electrical connection with said first and second electrodes; and a deformable ionic material retained in said sensing chamber in contact with said first and second electrodes and leaving a gap between said ionic material and said substrate separation structure;

wherein mobile electrons migrate from said first and second electrodes and a counter-ion layer accumulates from the ionic material in response to application of a sensing voltage to said first and second electrodes; and wherein contact between said ionic material and said first and second electrodes form electric double layers (EDL) having interfacial EDL capacitance which is influenced by ambient humidity to which the apparatus is exposed.

27. The apparatus recited in claim 26, wherein one or more portions of said first substrate, or said second substrate, or a combination of said first and second substrate, are modified to be hydrophilic toward centrally anchoring said ionic material within said housing, or are modified to be hydrophobic near the periphery of said housing toward preventing said ionic material from moving into contact with said housing.

28. The apparatus recited in claim 26, wherein said ionic material contains at least 25% anti-evaporation agent.

29. The apparatus recited in claim 26, wherein said conductive surface coating comprises indium tin oxide (ITO).

* * * * *